US008905404B2

(12) United States Patent
Costa

(10) Patent No.: US 8,905,404 B2
(45) **Date of Patent: *Dec. 9, 2014**

(54) CARD GAMES

(71) Applicant: Peter Costa, Narborough (GB)

(72) Inventor: Peter Costa, Narborough (GB)

( * ) Notice: Subject to any disclaimer, the term of this patent is extended or adjusted under 35 U.S.C. 154(b) by 67 days.

This patent is subject to a terminal disclaimer.

(21) Appl. No.: 13/747,289

(22) Filed: Jan. 22, 2013

(65) Prior Publication Data

US 2013/0130764 A1 May 23, 2013

Related U.S. Application Data

(63) Continuation-in-part of application No. 13/184,400, filed on Jul. 15, 2011, now Pat. No. 8,382,113.

(60) Provisional application No. 61/364,697, filed on Jul. 15, 2010.

(51) Int. Cl.
*A63F 1/00* (2006.01)
*G07F 17/32* (2006.01)
*A63F 13/00* (2014.01)

(52) U.S. Cl.
CPC .............. *A63F 1/00* (2013.01); *G07F 17/3293* (2013.01); *A63F 13/005* (2013.01)
USPC ............................................ 273/292; 463/13

(58) Field of Classification Search
USPC ............................................ 273/292; 463/13
See application file for complete search history.

(56) References Cited

U.S. PATENT DOCUMENTS

| | | | | |
|---|---|---|---|---|
| 5,395,120 | A | 3/1995 | Malek | |
| 5,713,574 | A | 2/1998 | Hughes | |
| 5,873,571 | A | 2/1999 | Vaisman et al. | |
| 6,012,719 | A | 1/2000 | Webb | |
| 6,056,641 | A | 5/2000 | Webb | |
| 6,237,916 | B1 | 5/2001 | Webb | |
| 6,311,978 | B1 | 11/2001 | Moody | |
| 6,345,823 | B1 | 2/2002 | Webb | |
| 6,371,867 | B1 | 4/2002 | Webb | |
| 6,409,174 | B1 | 6/2002 | Demarest | |
| 6,481,719 | B2 | 11/2002 | Webb | |
| 6,523,831 | B2 | 2/2003 | Webb | |
| 6,609,711 | B1 | 8/2003 | Campbell | |
| 6,698,759 | B2 | 3/2004 | Webb et al. | |
| 6,749,200 | B2 | 6/2004 | Yurkins | |
| 6,877,748 | B1 | 4/2005 | Patroni et al. | |
| 7,108,265 | B1 | 9/2006 | Dargue | |
| 7,137,630 | B2 * | 11/2006 | Yurkins | 273/292 |
| 7,175,180 | B2 * | 2/2007 | Webb | 273/292 |
| 7,175,522 | B2 | 2/2007 | Hartl | |
| 7,416,187 | B2 | 8/2008 | Forster | |
| 7,993,191 | B2 | 8/2011 | Evans et al. | |
| 2001/0040344 | A1 | 11/2001 | Zahedi | |
| 2002/0195775 | A1 | 12/2002 | Webb et al. | |
| 2006/0255540 | A1 | 11/2006 | O'Hagan | |

(Continued)

OTHER PUBLICATIONS

Pojack Gaming, "How to Play," Jun. 8, 2009; 31 pages.

*Primary Examiner* — Michael Dennis
(74) *Attorney, Agent, or Firm* — Adams Grumbles, LLP; Brittany Nanzig

(57) ABSTRACT

A card game in which players compete against a dealer to obtain a poker hand and a blackjack hand that beats the dealer without busting by exceeding a predetermined number of points.

15 Claims, 5 Drawing Sheets

(56) References Cited

U.S. PATENT DOCUMENTS

| | | | |
|---|---|---|---|
| 2006/0267285 | A1 | 11/2006 | Webb et al. |
| 2007/0210520 | A1 | 9/2007 | Webb |
| 2007/0228653 | A1 | 10/2007 | Lambert et al. |
| 2007/0241506 | A1 | 10/2007 | Kling et al. |
| 2008/0139268 | A1 | 6/2008 | Zora |
| 2009/0085296 | A1 | 4/2009 | Webb |
| 2010/0013157 | A1 | 1/2010 | Marquez et al. |
| 2011/0300918 | A1 | 12/2011 | Sparago |

* cited by examiner

CARD GAMES

RELATED APPLICATIONS

This application is a continuation-in-part of U.S. patent application Ser. No. 13/184,400, filed on Jul. 15, 2011, titled CARD GAMES, which claims the benefit of U.S. Patent Application Ser. No. 61/364,697 filed on Jul. 15, 2010, titled Card Game, and relates to U.S. Patent Application Ser. No. 61/249,849 filed on Oct. 8, 2009, titled POKER BUST, and to U.S. Patent Application Ser. No. 61/157,519 filed on Mar. 4, 2009, titled POKER BUST, and to U.S. patent application Ser. No. 12/717,819 filed on Mar. 4, 2010, titled Card Games, and to U.S. patent application Ser. No. 13/396,183, filed on Feb. 14, 2012, titled GAMING DEVICE AND SYSTEM AND METHOD FOR PROVIDING POKER-BLACKJACK GAME, which are hereby incorporated by reference in their entireties.

BACKGROUND

Traditionally, card games often utilize a deck including 52 cards. These cards are often made of a heavy glossy paper or plastic material. The front surfaces of the cards include printed indicia thereon that distinguish the cards from each other. The rear surfaces of the cards may be blank or can include a decorative design or pattern. The rear surface is typically the same on all cards so that one card cannot be distinguished from another card by viewing the rear surface. Various games can be played using this standard deck of cards.

Card games are often now played in an electronic format online or utilizing an electronic gaming cabinet or video poker type machine. The present invention relates to a game that can be played both in the traditional format using a deck of cards or in an electronic format.

SUMMARY

In general terms, this disclosure is directed to a card game. In one possible configuration and by non-limiting example, players compete against a dealer to obtain a poker hand and a 21-point blackjack hand that beat the dealer without busting by exceeding 21 points. In another possible configuration, players compete against a dealer to obtain a poker hand and a 31-point blackjack hand that beat the dealer without busting by exceeding 31 points. In another possible configuration, players compete against a dealer to obtain a poker hand and a 41-point blackjack hand that beat the dealer without busting by exceeding 41 points. In some configurations, the dealer may be one of the players, with the role of dealer rotating through each player for each hand played.

One aspect is a method of playing a card game with players and a dealer, the method comprising: obtaining two wagers from each player, the wagers being of equal value and including a first wager and a second wager; dealing to each player and the dealer, in turn, five cards; obtaining a decision from each player as to which three cards to keep and which two cards to discard; and determining whether a player has won by comparing the player's cards with the dealer's cards and determining if the player's cards beat the dealer's cards according to both a highest poker hand and also according to a blackjack hand.

Another aspect is a method of playing a card game with players and a dealer, the method comprising: obtaining wagers from each player, the wagers being of equal value and including a first wager and a second wager; dealing to each player and the dealer, in turn, three cards, wherein each of the cards dealt to a player is dealt face up; obtaining a decision from each player as to whether to draw one or more additional cards, and if so, providing the one or more additional cards; and determining whether a player has won by comparing the player's cards with the dealer's cards and determining if the players cards beat the dealer's cards according to both a highest poker hand and also according to a 31-point blackjack hand or a blackjack hand with another numerical limit.

Another aspect is a method of playing a card game with players and a dealer, the method comprising: dealing two community cards; dealing one card face-up to each player; dealing one card face-down to the dealer; obtaining a decision from each player, in turn, as to whether to draw one or more additional cards, and if so, providing the one or more additional cards; providing additional cards to the dealer until a combined face value of the dealer's cards and the community cards has reached or exceeded a predetermined value; and determining whether a player has won by comparing the player's cards, including the community cards, with the dealers cards and determining if the players cards beat the dealer's cards according to both a highest poker hand and also according to a 31-point blackjack hand. The numerical limit of the blackjack hand in the previous example is 31 points. This disclosure will continue to use 31 as an example numerical limit for a blackjack hand. It should be noted that the example point totals could have a numerical of 41, 51, 61, or any other such number, in some embodiments of the present invention.

Another aspect is a method of playing a card game with players and a dealer, the method comprising: dealing two cards face down to each player; obtaining wagers from each player; dealing to each player in turn a third card; obtaining a second round of wagers; dealing to each player in turn a fourth card; obtaining a third round of wagers; dealing to each player in turn a fifth card; obtaining a fifth round of wagers; obtaining a decision from each of the players which three cards they will use to create either the best poker or the best blackjack hand; and determining whether a player has won by comparing the player's chosen cards, including the community cards, with the other players' cards and determining if the player's cards beat the other players' cards according to both a highest poker hand and also according to a blackjack hand of a predetermined value. Yet other aspects are described herein.

DETAILED DESCRIPTION

Various embodiments will be described in detail with reference to the drawings. Reference to various embodiments does not limit the scope of the claims attached hereto. Additionally, any examples set forth in this specification are not intended to be limiting and merely set forth some of the many possible embodiments for the appended claims.

Figure 1:
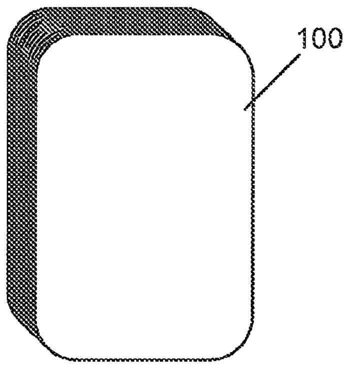
FIG. 1 is a schematic block diagram of an example deck of playing cards.
Figure 2:
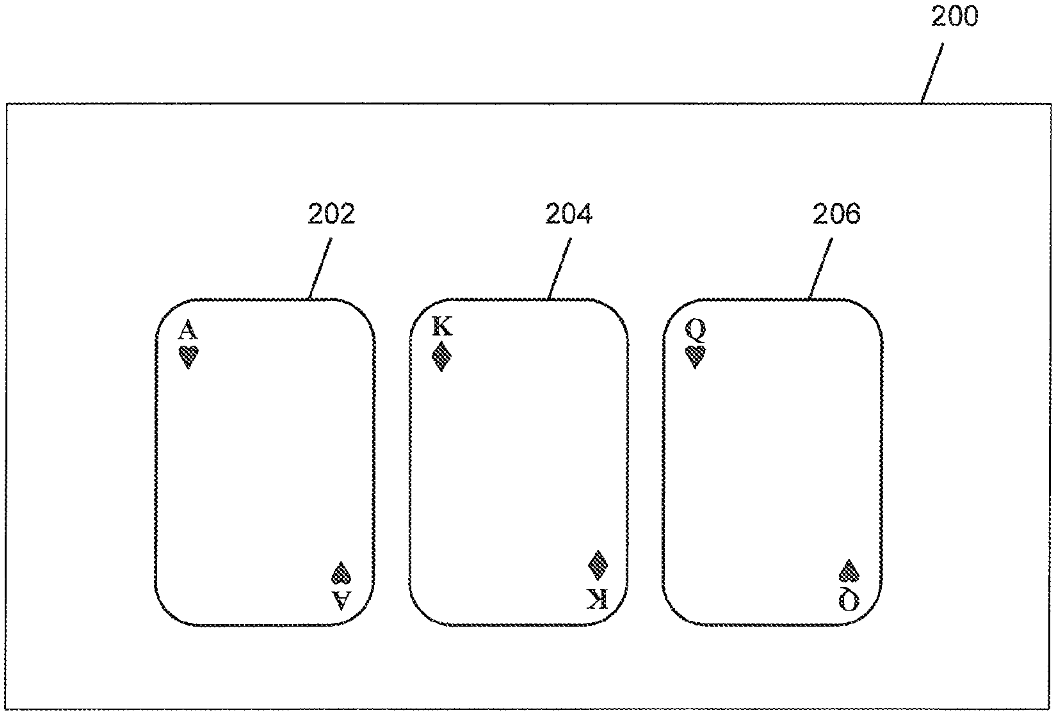
FIG. 2 is a schematic block diagram of several playing cards arranged on a table during play.
Figure 3:
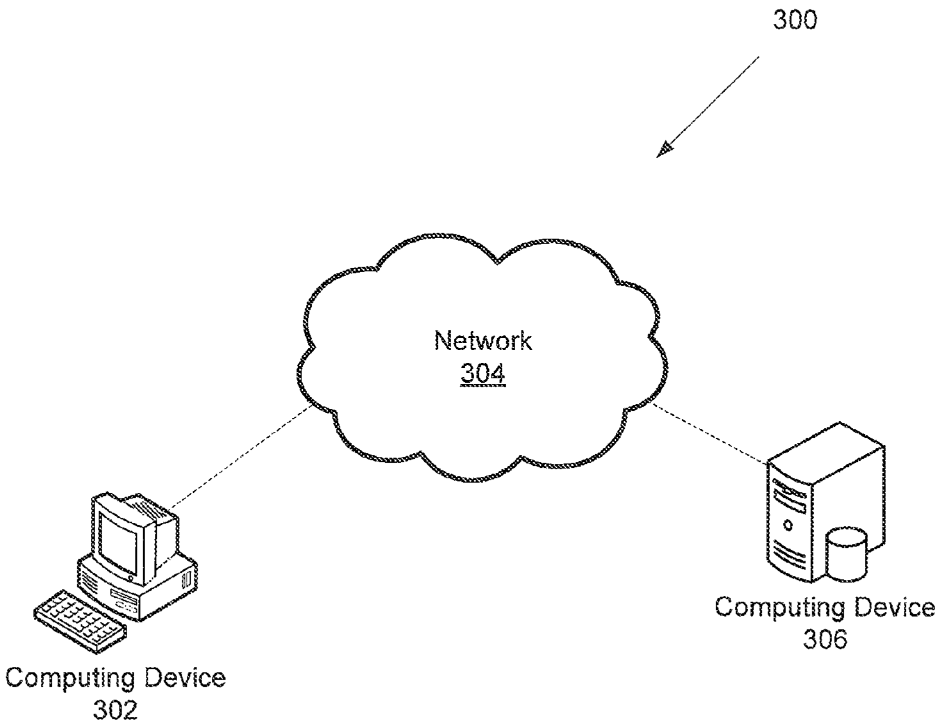
FIG. 3 is a schematic block diagram of an example computing system.

As described further below, the card games can be played using one or more standard 52-card decks of cards (such as shown in FIG. 1). Some embodiments are played on or around a playing surface like a table (such as shown in FIG. 2). In other examples, the card games can be played on one or more computing devices (such as shown in FIG. 3) located at establishments or in an online environment over a network such as the Internet. In some examples, when card games are played on computing devices, the computing devices generate visual representations of physical playing cards that are, for example, displayed on a display device, such as a computer monitor.

Game Play and Rules

The card game disclosed herein is a split game with 50% of the pot going to the best blackjack score of 21 (or another predetermined number as described herein) and 50% going to the best poker hand of three cards.

Players will be dealt five cards in total with the first two cards being dealt face down and three cards face up. From the total of five cards, players MUST use THREE cards to create the best blackjack or poker hand. The point value for each card is as face value, with all picture cards counting ten points and the Ace counting one or eleven.

There are four rounds of betting with the first being after the two face down cards are dealt. A button and blinds are posted with players acting in turn after the first two face down cards are dealt. Players may then muck, call or raise.

Players still in the hand will now be dealt one face-up card. A second round of betting takes place, the first player to act being the player with the highest card.

Each player then receives a second face up card and a third round of betting takes place, the first player to act being the player with the poker high hand.

A final and third card is dealt face up to each player and the final round of betting takes place, the first player to act being the player with the poker high hand.

Before the showdown, players must discard two cards—leaving three cards that will determine if a player has won or lost. Very importantly, these three cards must total no more than 21 (or another predetermined number as described herein).

If player's score is over 21 or the predetermined number, that player has busted and cannot win any part of the pot. This will be explained further in the strategy section.

Strategy

Starting Hands (Two Down Cards)

There are very few starting deemed to be extremely bad. In effect, it is expected that each hand will see multi-way action. However, if there is a raise before the first open hand is dealt, certain hands will have less value. Players will soon determine which hands should or should not be played. In effect, similar to Holdem whereas certain factors will need to be considered.

Strong Starting Hands

A-K suited and A-Q suited are very strong hands. When starting with either of these hands, players will have three more cards from which to make a straight flush, a flush, a straight, or a score of 21. Just as importantly, as they can only use three cards for BOTH blackjack and poker, a player can make a hand that could win both pots. For example, a royal flush and 21, (A-K-Q) a flush and 21, etc.

Any suited Ace is also a good starting hand, for example, A-J, A-10. However, such hands are less likely to scoop both pots.

A-5 suited is also a powerful starting as another 5 would give the player 21 and a pair. Although less valuable in multi-way action, it would be an extremely powerful hand heads or even against two players who are likely playing 21.

Therefore, the math of the game begins to come into play with just the starting hand. With this in mind, 5-6 suited is also a powerful hand for drawing to a flush or 21 or both. The same applies to 6-7 suited and to any suited cards counting eleven.

Pairs are valuable as three of a kind is almost assured of winning 50% of the pot. However, not all pairs should be played. For example, any pair of 8-8 and over will only be a good hand if the final three-card hand results in 21 points, as three-of-a-kind (8-8-8) will be a busted hand (over 21).

The best three pairs would therefore be 7-7 (as a third seven is assured a win). 5-5 means that a player would be drawing to 21 with any single ace and has a potential for three-of-a-kind. Irrespective, any starting pair over 8-8 will have potential to make 21. However, it will be limited potential due to having just one card. For example, 8-8 will require a five, 9-9 will require a three and two tens or two face cards will require an ace.

Higher card pairs over 8-8 will more often than not have the opportunity to improve to 21 on the third card as game play suggests that limping (calling the amount of the big blind) will be more common than raises. In such cases, when a player makes 21 on the third card, it would be a strong hand against just one or even two players. In multi-way action (4-5 or more players), the opposite may apply as there will be a major possibility of such a hand splitting 50% of the pot with two or even more players; in effect, losing on the hand.

A-A is also a very strong starting hand. However, much will be dependent on the third and fourth cards. In multi-way action, A-A will need to have a strong drawing hand or 21 in order to continue. Simply put, caution should be applied and, as always, much will be dependent on the action from other players. Heads up, A-A will certainly provide value.

In multi-way pots, it would not be unusual to see three of five players holding 21 after the fourth card, sometimes even after the third card. It's also likely to see four out of five players holding 21 and in most cases, drawing to a big poker hand. Caution is therefore advised if holding 21 without draw in multi-way pots.

Small connected starting hands such as 4-3 and 5-4 could lead to trouble in multi-action pots. They obviously have more value if suited, but again, could lead to trouble in multi-way pots.

Hands to avoid would tend to be middle to high connected cards such 8-9, or 9-10. Although making 21 would be realistic, it could mean trouble in multi-way action. This may also apply when suited but as always, actions from other players would be a good indicator as to the correct play.

Skill Factor

Although very simple to play, the disclosed game is extremely skillful in every stage of the hand. Although there is immense flexibility with starting hands, this flexibility will ensure multi-way action in majority of pots. Players will therefore need to be cautious and not commit heavily because they have 21. In other words, having 21 does not mean an automatic bet. In fact, the correct play (depending on various factors and number of players in the hand) may be a check-call. Folding will also be an option in some cases.

One major skill will be which hand to keep in any show-down as sometimes, the best hand of 21 may not be the best option.

For example, in heads-up, a check after the river card may indicate a 21 but with no real poker hand within that 21, other than perhaps Ace or King high. Therefore, an opponent holding 21 with Q high (or even lower) may choose to not keep 21 and play a lower points value of, for example, 16 by keeping 3-3-Q, hoping for split rather than what would be an obvious tie for 21 and a loss for the poker hand.

Players will have tough decisions to make in some hands. In the above scenario, the first player may sacrifice the 21 with King high, for a lower score that contains a pair, for example, keeping 7-7-4 for a score of 18 and a pair sevens. This would in fact be a great play by both players, but an exceptional play from the player holding the pair of sevens if he suspects his opponent of making that move.

In some cases, a player may even call a bet on the river against three players with a pair if that player suspects that the other three players are holding 21 without a real poker hand. Again, very skillful, but not very obvious as to the timing.

Overall, just as in no limit holdem or other forms of poker, players will improve strategy with play.

Version One

Some embodiments of the card game bring together the two popular games of blackjack and poker. The game is played by using a standard 52-card deck. The point value for each is as face value, with all picture cards counting ten points and the Ace counting one or eleven.

The object of the game is to better both the blackjack points score and poker hand of the dealer, without the player's cards totaling more than 21. As for the poker wager, the three best cards will be used to form a poker hand to determine winners.

Casino Version Rules

In an example embodiment of a card game, players make two wagers of equal value: one for a blackjack hand and the other for a poker hand. Players then compete against the dealer for both hands. The object of the card game is to use three cards (from a total of five cards) to create a total points value as close to 21 as possible without going over 21. All face cards (Kings, Queens and Jacks) are valued at 10 points. Aces are worth 1 or 11, whichever is preferable. All other card values are represented by their number. Of the five cards dealt to a player, the player discards two cards and keeps three cards. The three cards chosen (kept) by the player are used to determine a) the player's poker hand and b) the player's blackjack hand. A blackjack in this game will consist of one Ace (value of 1) and two other cards with a face value of 10 points, or one Ace (value of 11) and one other card with a value of 10 points.

Figure 4:
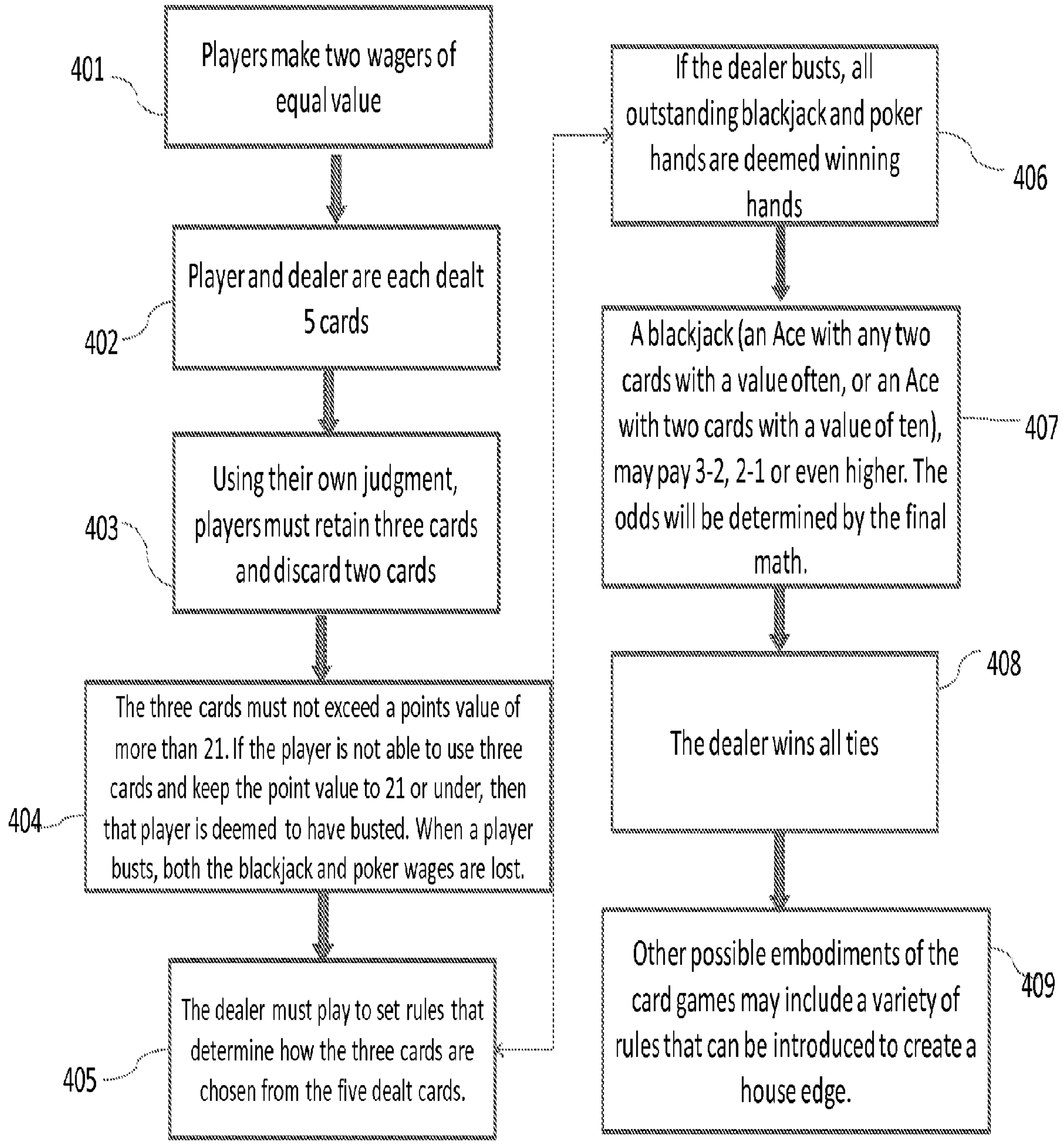
FIG. 4 is a flow chart of the game method according to an embodiment of the present invention.

FIG. 4 is a flow chart illustrating a method of game play according to an embodiment of the present invention wherein:

1. Player makes two wagers of equal value, as in step 401.
2. Player and dealer are each dealt 5 cards, as in step 402.
3. Using their own judgment, players must retain three cards and discard two cards, as in step 403.
4. The three cards must not exceed a point value of more than 21. If the player is not able to use three cards and keep the point value to 21 or under, then that player is deemed to have busted. When a player busts, both the blackjack and poker wagers are lost, as in step 404.
5. Referring to step 405, the dealer must play to set rules that determine how the three cards are chosen from the five dealt cards. Unlike the player, who has the option as to which three cards are chosen, the dealer must choose the three cards that form the highest possible score closest to 21. In rare instances however, the dealer will have more than one choice. In such cases, the dealer must use the three cards that optimize the dealer's poker hand, but only if it does not alter the dealer's blackjack points value.
6. If the dealer busts, all outstanding blackjack and poker hands are deemed winning hands, as in step 406.
7. A blackjack (an Ace with any two cards with a value of ten, or an Ace with two cards with a value of ten), may pay 3-2, 2-1 or even higher, as in step 407.
8. The dealer will win all ties, as in step 408.
9. Other possible embodiments of the card games may include a variety of rules that can be introduced to create a house edge. For example: a dealer will tie any poker hand when the dealer only manages to score a points total of 13, 14 or even higher. This may include one or more points totals. For example, a dealer will tie all blackjack hands when scoring 13 or 14 points. Another embodiment allows the dealer to create the best poker hand if the dealer is not able to score a minimum of 17 points for the blackjack hand.

Some embodiments include one or more of the following optional wagers.

"Bust insurance:" In some embodiments, players may place a wager before the cards are dealt for insurance against the possibility of going bust.

"Win Both Wagers:" In some embodiments, player may place a wager before any cards are dealt on the possibility of winning both the blackjack and poker wagers. The odds on this will vary between 5-2 and 3-1.

"Bonus payouts:" Another optional wager of some embodiments can pay a variety of odds for a five-card poker hand. For example, one pair, two pair, three-of-a-kind, five-card straight, five-card flush, four-of-a-kind, and a royal flush. For extra excitement and fun, one or more jackpots could be offered. A jackpot would be won, for example, by any player having a royal flush made of the three chosen (kept) cards. Example: Ace of diamonds, King of diamonds, and Queen of diamonds. Others hands could be used to determined the winner of a jackpot.

"Pair Plus:" In some embodiments, a player may wager that they will be dealt a hand with a particular outcome before any cards are dealt, such as one pair, or some other valuable configuration.

Player must make two wagers of equal value, one for the blackjack part of the game, the other for the poker game. However, it may well be viable to allow these bets to be of different amounts.

Also, it is possible in all versions the card games disclosed herein that continuation bets and side bets be allowed throughout the game.

Video/Slot Machine Version

The video machine version would apply the same rules as the casino version. The only difference is that it may be one player versus the dealer, or possibly multiplayer, depending on the available technology. Several additions could apply, but in general it will be presented similar to the blackjack that is currently on offer.

Online Casino Version

The same rules would apply for any online casino version, whether it be a single player game, or a multi-player game.

This version is played in a limit format or even in a no limit format.

A button (as in poker) is used to dictate the order in which players act.

Online Player Vs. Player Version

FIG. 1 is a schematic block diagram of a deck of playing cards 100. A standard 52 card deck of playing cards 100 is used in some embodiments. FIG. 2 shows some of cards 100 (202, 204, 206 and 208) arranged on a table.

In some embodiments, playing cards 100 are made of paper, such as a heavy paper, thin card, or thin plastic, or may be electronically represented on a screen as though they were physical playing cards as described herein. Playing cards 100 typically include a face surface and a back surface. The face surface typically includes markings thereon that distinguish the cards from other cards in the deck. The markings are also used to determine the permissible uses of each card according to the rules of the game being played, such as discussed in more detail herein. Examples of markings include printed indicia that identify the card as being one of an Ace, 2, 3, 4, 5, 6, 7, 8, 9, 10, Jack, Queen, and King, and also identify the card as being of a suit selected from diamonds, clubs, hearts, and spades, in some embodiments.

FIG. 3 is a schematic block diagram of an example computing system 300. The example computing system 300 includes at least one computing device 302. In some embodiments the computing system 300 further includes a communication network 304 and one or more additional computing devices 306 (such as a server).

Computing device 302 can be, for example, located in a gaming establishment or can be a computing device located in a user's home. Computing device 302 can be a stand-alone computing device 302 or a networked computing device that communicates with one or more other computing devices 306 across network 304. Computing device 306 can be, for example, located remote from computing device 302, but configured for data communication with computing device 302 across network 304.

Figure 3A:
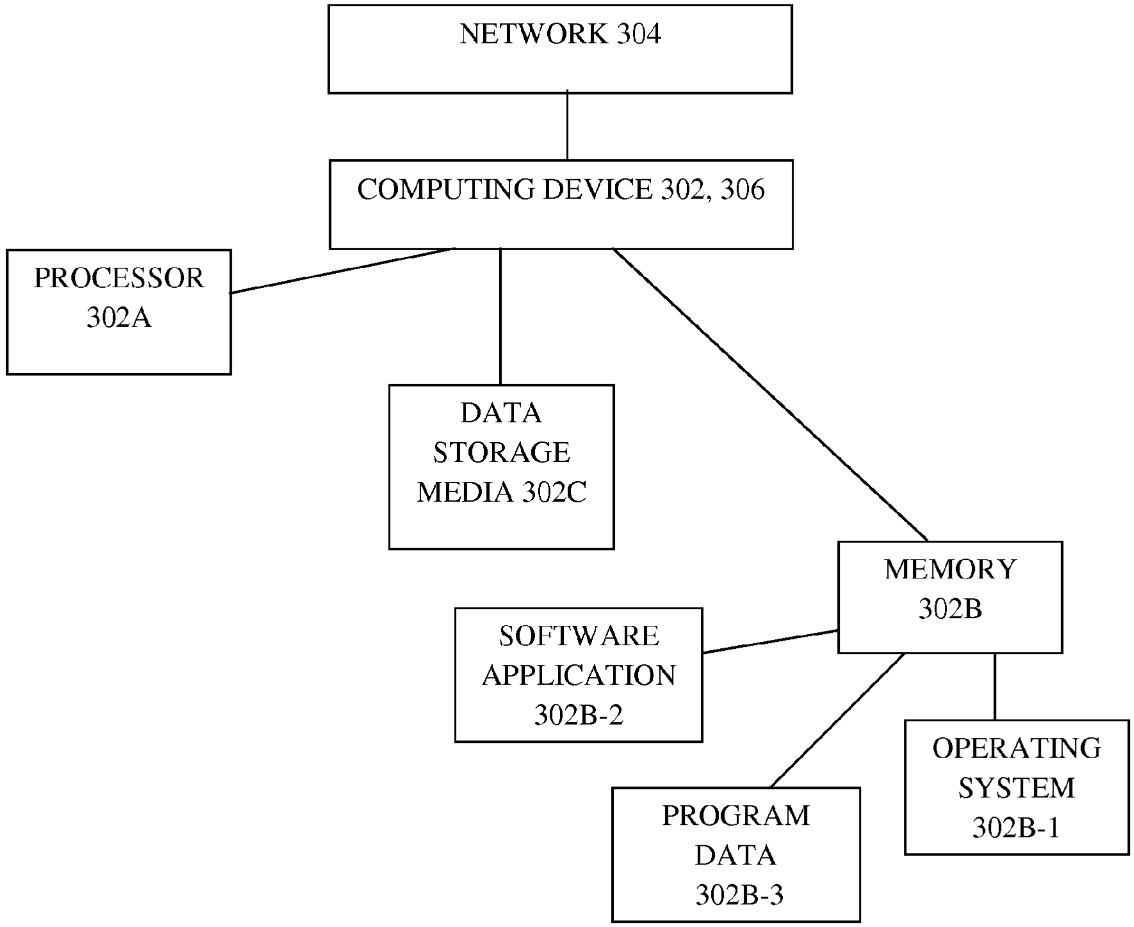
FIG. 3A is a schematic block diagram of an example computing system.

FIG. 3A is a schematic block diagram of an example computing device 302 or 306. In some examples, the computing devices 302 and 306 include at least one processor or processing unit 302A and system memory 302B. Depending on the exact configuration and type of computing device, the system memory 302B may be volatile (such as RAM), non-volatile (such as ROM, flash memory, etc.) or some combination of the two. System memory 302B typically includes an operating system 302B-1 suitable for controlling the operation of the computing device, such as the WINDOWS® operating systems from Microsoft Corporation of Redmond, Wash., or a server, such as Windows SharePoint Server, also from Microsoft Corporation. The system memory 302B may also include one or more software applications 302B-2 and may include program data 302B-3.

The computing device may have additional features or functionality. For example, the device may also include additional data storage devices 302C (removable and/or non-removable) such as, for example, magnetic disks, optical disks, or tape. Computer storage media 302C may include volatile and nonvolatile, removable and non-removable media implemented in any method or technology for storage of information, such as computer readable instructions, data structures, program modules, or other data. System memory, removable storage and non-removable storage are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device. An example of computer storage media is non-transitory media.

Figure 3B:
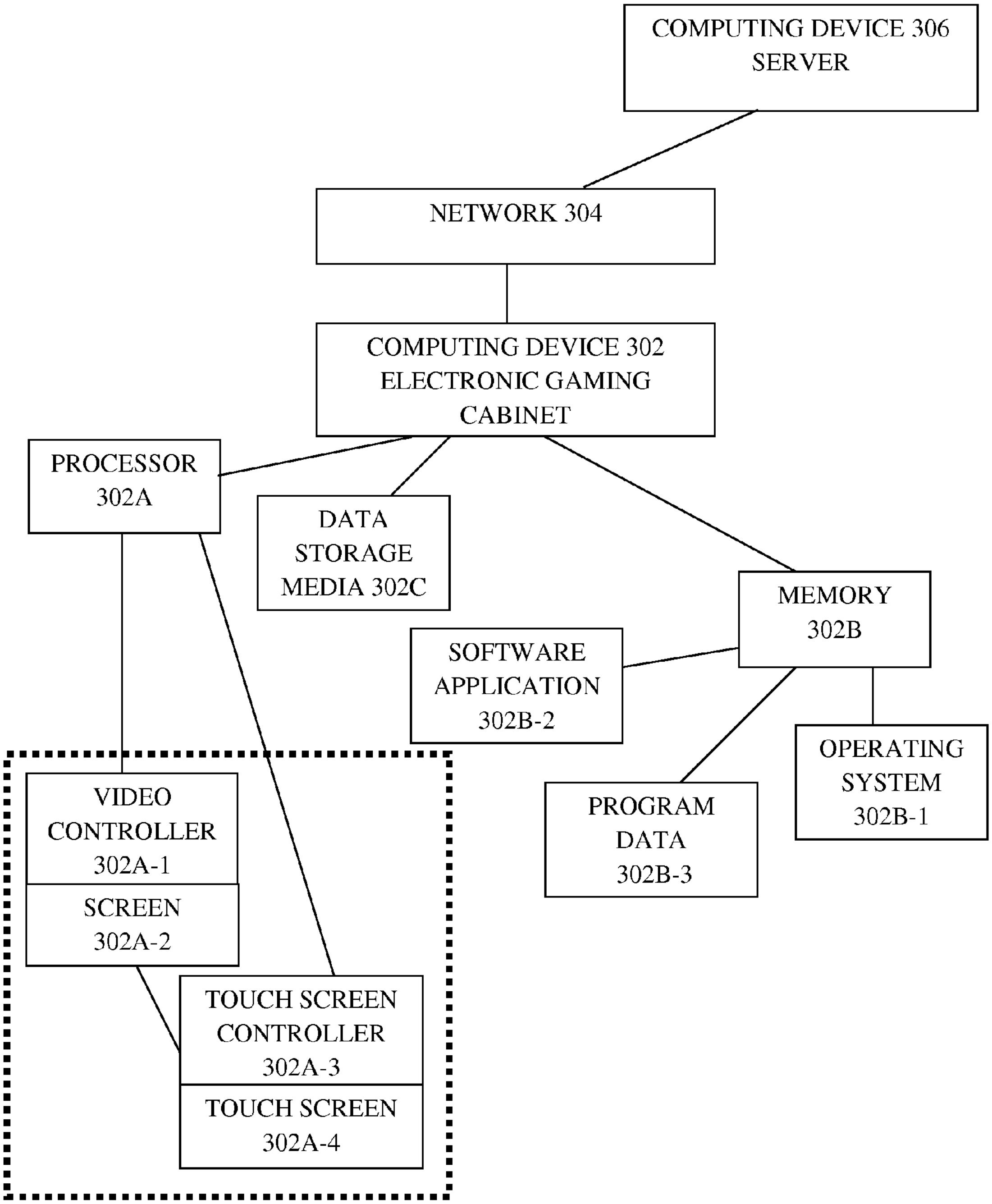
FIG. 3B is a schematic block diagram of an example computing system.

In some examples, one or more of the computing devices 302, 306 can be a gaming cabinet or video poker terminal located in an establishment, such as a casino or bar. A schematic diagram of such a device is shown in FIG. 3B. The computing device 302 may be an electronic gaming machine with input device options including, but not limited to, a video controller 302A-1, a screen 302A-2, a touch screen controller 302A-3, or a touch screen 302A-4. In other examples, the computing device can be a personal computing device that is networked to allow the user to play card games disclosed herein at a remote location, such as in a player's home or other location.

In some embodiments, computing device 302 is a smart phone or other mobile device. In some embodiments the rules of game play are stored as data instructions for a smart phone application. A network 304 facilitates communication between the computing device 302 and one or more servers, such as computing device 306, that host the card games. The network 304 may be a wide variety of different types of electronic communication networks. For example, the network may be a wide-area network, such as the Internet, a local-area network, a metropolitan-area network, or another type of electronic communication network. The network may include wired and/or wireless data links. A variety of communications protocols may be used in the network 108 including, but not limited to, Ethernet, Transport Control Protocol (TCP), Internet Protocol (IP), Hypertext Transfer Protocol (HTTP), SOAP, remote procedure call protocols, and/or other types of communications protocols.

In some examples, computing device 306 is a Web server. In this example, computing device 302 includes a Web browser that communicates with the Web server to request and retrieve data. The data is then displayed to the user, such as using a Web browser software application. In some embodiments, the various operations, methods, and rules disclosed herein are implemented by instructions stored in memory. When the instructions are executed by the processor of one or more of computing devices 302 and 306, the instructions cause the processor to perform one or more of the operations or methods disclosed herein. Examples of operations include the operations of game play and enforcement of one or more rules of the game.

In one embodiment, the card game may be played with players and a dealer using the computing system 300. As described above, the computing system 300 includes at least one server, such as the one or more servers 306 to host the card game and the at least one computing device 302 communicably coupled to the one or more servers 306 through the communication network 304. Accordingly, the card game may be played by obtaining wagers from each player through the at least one computing device 302. The wagers may be of equal value and include a first wager and a second wager. Thereafter, five cards may be dealt to the each player and the dealer through the one or more servers 306, wherein each of the cards dealt to a player is dealt face up.

Subsequently, a decision from the each player through the at least one computing device 302 may be obtained as to which three cards to keep and which two cards to discard, which actions may be performed through the one or more servers 306.

As described above, the cards dealt to the each player and are visual representations of physical playing cards, the visual representations being generated by the at least one computing device 302. Also, dealing to each player and the dealer, in turn, five cards includes displaying the visual representations of the physical playing cards on a display device (not shown) of the at least one computing device 302.

Further, a total score of the player's cards may be determined through the one or more servers 306 for establishing the formation of a blackjack hand for the each player. As described above, the blackjack hand is a 21-point blackjack hand formed when the total score is up to a maximum of 21 points. Thereafter, it may be determined whether a player has won by comparing the player's cards with the dealer's cards through the one or more servers 306 based on the total score, and if the players cards beat the dealer's cards according to both a highest poker hand and also according to the 21-poker blackjack hand, through the one or more servers 306.

As mentioned above, each of the at least one computing device 302 and the one or more servers 306 includes a processor (not shown) and a memory (not shown), and wherein at least one of the respective memories stores instructions, which executed by the respective processor, cause the respective processor to perform one or more operations of obtaining wagers, dealing, obtaining a decision, and determining whether a player has won.

The each of the at least one computing device 302 may be one of a mobile device and a computer communicably coupled with the one or more servers 306 for data communication. Further, the each of the at least one computing device 302 is located at one of a gaming establishment and a remote location.

Version Two

Some embodiments of the card game bring together the two popular games of blackjack and poker. The game is played by using a standard 52-card deck. The points value for each is as face value, with all picture cards counting ten points and the Ace counting one or eleven.

The object of the game is to better both the blackjack points score and poker hand of the dealer, without the player's cards totaling more than 31, or another numerical limit. As for the poker wager, the three best cards (or two or four) will be used to form a poker hand to determine winners.

Casino Version Rules

Player must make two wagers of equal value, one for the blackjack part of the game, the other for the poker game. However, it may well be viable to allow these bets to be of different amounts.

Another option would be to include a "bonus" bet that will apply only to the first three cards dealt to each player. Example: various odds being paid for any pair, straight, flush, straight flush and royal flush, all using two, three or four cards. The odds will be determined by the final math.

Each player is, in turn, dealt three cards face up. The dealer is also dealt three cards, but only two are turned face up. Or, alternately, the dealer too is dealt three cards face-up.

Each player now has a decision to make as to whether or not to draw any further cards to complete their hand.

The object is to beat the dealer on both blackjack and poker.

Players who bust (going over the set numerical limit, which could be 31. 41, 51, 61 or another number), automatically lose both bets.

The dealer must draw on soft 27 or 26—depending on the final math to the game.

When the dealer busts, all players remaining in the hand will win both bets.

Players may double down on their blackjack hand if the first three cards total 19 or 20. However, if they take that option, they can only receive one card and their turn is complete.

Aces count as 1 or 11. Therefore, should a player be dealt Ace-Ace-Nine this would total as 31 in some embodiments of the present invention.

Depending on the math of the format, several additions may be brought into the format, for the purpose of adjusting any edge that the "house" or the player may have. For example, the dealer may be allowed to also draw one soft 28, or be forced to stay on 25 and 26, if the dealer has a "made" hand in poker. A "made" hand in this instance, is defined as having a straight with three cards, a flush with three cards or four cards, or three-of-a-kind. Further adjustments to the format could also be introduced to reduce or increase the edge of the house.

For extra excitement and fun, one or two running jackpots could be offered. The main jackpot would be won by any player being dealt a royal flush on the first three cards. Example: Ace of diamonds, King of diamonds, and Queen of diamonds. The second and consolation jackpot would be paid to any player making a royal flush at any time during the hand.

An extra betting option can be offered on the poker hand from the first three cards dealt to players. Also, it is possible in all versions the card games disclosed herein that continuation bets and side bets be allowed throughout the game.

Video/Slot Machine Version

The video machine version would apply the same rules as the casino version. The only difference is that it may be one player versus the dealer, or possibly multi-player, depending on the available technology. Several additions could apply, but in general it will be presented similar to the blackjack that is currently on offer.

In some embodiments, the video machine version would be played on an electronic gaming cabinet, such as a video poker type machine in a casino or other venue.

Online Version

The same rules would apply for any online casino version, whether it be a single-player game, or a multi-player game.

Online Player Vs. Player Version

This version is played in a Limit format or even in a No Limit format.

A button (as in poker) is used to dictate the order in which players act.

Each player is dealt one card face down, and then another card face up.

First round of betting begins.

Another card is dealt face up to each player in turn. Another round of betting follows.

Each player takes however many cards to complete their hand. Players going over 31 (or other set numerical limit in other embodiments) are deemed to have busted and as such forfeit whatever monies they have contributed to the pot.

A final round of betting now takes place with a maximum of one bet and two raises. Once betting has been completed, all monies in the pot will be split between the best blackjack hand and the best poker hand, which in this instance uses three cards.

There is no minimum "score" required in blackjack. Therefore, all blackjack bets will be decided on the score closest to 31, or the set numerical limit. For example: Player A has a Nine-high straight and a total of 24. Player B has a Nine-high straight with a total of 25. Players will share the poker hand, but player B would win the blackjack hand as it is closer to 31.

A Limit betting structure that will apply is as follows in an example embodiment having a 30-60 limit. The first two rounds of betting will be 30. The third round of betting will be 60, and the fourth round will be 60 or 120 (spread limit).

The above cash game format is one of several that can be applied, including the option for the game to be played against the dealer, with one of the players being the dealer. In some embodiments, the above cash game may be played as a multi-player or ring game. There may be a designated dealer who remains the dealer throughout the entire gameplay in some embodiments. In other embodiments, a button as described above may be used to designate a rotating dealer, where the players would each act as dealer on a rotating turn basis. Embodiments of the game using a rotating dealer may be played as an online or electronic cabinet game, or they may be played as a live table game or ring game.

Version Three

Players place a wager on both the poker and blackjack hands, before the dealer deals two community cards that will form both the blackjack and poker hand for both players and dealer.

The object of the game is for players to draw further cards and to make the best blackjack hand to a total of 31 while at the same, make the best poker hand. If a player goes over 31, then the player loses both the blackjack and poker hands wager. Another option, if the player goes over 31, is to allow the poker wager hand to still be active.

After dealing the two community cards, the dealer will deal to each player one card face-up, while the dealer will be dealt one card face down.

Players then act in turn and may draw any amount of cards to improve their starting hand. Players also have the option to double down on their poker hand after they are dealt their first card.

For example, the community cards total ten and the player's card is an Ace. If a player does double down, then the player will receive just one card.

After each player has acted, it will be the dealer's turn to act. The dealer will then draw further cards if required. The dealer may be forced to refrain from taking further cards when the dealer's total stands at 27. However, depending on the final math, this total may be greater or lower than 27.

There is no soft hand as it would increase the cards the dealer needs to calculate—therefore, all Aces count as 11. If a flop contains three Aces, then that could also be an instant winner for the players in some embodiments.

A further option in this version is to allow players to have a free draw when their points total is 22, 23, 24, 25, 26. With this option, a player's wager is still active if the player's points total over 31. In embodiments wherein the points total for blackjack is 41, players may be allowed to have a free draw when their points total is 32, 33, 34, 35, 36. With this option, a player's wager is still active if the player's points total over 41.

Example Hand

The two community cards are a Queen of spades and a King of spades. This totals a point value of 20.

Player A has been dealt a deuce of spades. At this stage, player A has a total of twenty points for the blackjack hand, and a flush—in this case with three cards from all cards available—for the poker hand. If the free card option is in place and available when a player has 22 points, then player A will be dealt another card. If that card is a picture card or a Ten, then player A has bust and gone over 31. However, with the free card option, the Ten is now discarded and the player's score remains at 22 for the blackjack hand and a King-Queen-Two flush for the poker hand, which in this instance is made from three cards.

Player B has been dealt a Jack of hearts for a total of 30 points for the blackjack hand and a straight for the poker hand. Therefore, player B would in all probability not be taking any further cards.

Player C has been dealt a Six of diamonds and therefore has a point value of 26 for the blackjack hand. With the free-card option, player C would be dealt a further card. In this case, the ideal card would be the Five of spades as this would give the player a point's total of 31 for the blackjack and a Queen-King-6 for a flush. In this example, player C was dealt the Six of spades and busts. In this example, the Six is now discarded leaving the player with a point's total of 26 and a three-card poker hand of King-Queen-6.

As all three players have acted, the dealer then reveals his face-down card. In this example, the dealer's card is in fact the Seven of hearts. The dealer's blackjack hand value is therefore 27.

In this example, Player A would lose the blackjack hand and win the poker hand against the dealer.

Player B wins both the blackjack and poker hands against the dealer.

Player C loses both wagers against the dealer.

Depending on the final math, it may well require that a house be introduced into this version. One option would be for the dealer to be allowed to draw a free card on 27. For example, if the free card option is given to players on a point's total of 25 and 26, the dealer would be allowed a free card on 25, 26 and 27.

Another house edge feature is a push for all blackjack hands if the dealer's points total is at exactly 32. In the above example, if the dealer was allowed to draw a free card on 27, and draw the Five of spades (making a total of 32), not only could this be a push, but the Five of spades could be used by the dealer in the poker hand. In this case, the dealer would in fact have a flush of King-Queen-5.

Another option is to introduce a player edge when the two community cards are an Ace with a Ten or picture card. In this case, all wagers on the blackjack will be winners and paid at 3-2 or 1-2 or even 2-1.

A further option is to introduce a player edge when two of the cards in the player's hand are any face card and the third card is an ace, as shown in FIG. 8, with an extra payout of, for example, 2-1 or 1.5-1.

Version Four

In this version, a player places a wager of equal or varying value on both a blackjack hand and a three-card poker hand. The object is to beat the dealer. Beating the dealer will pay 1-1 on each wager. The pay-out can be modified beyond 1-1.

The dealer deals three community cards from which all the players and dealer will use to form a blackjack hand to a maximum of 31 points and the poker hand, which in this case could be made using three cards.

Once the three community cards have been dealt, each player will in turn have the option to draw further cards.

Example Hand

Community cards are King of spades, Queen of spades and the Ten of diamonds.

In this example, as all three cards total 30 points, the players and the dealer will not be drawing any further cards and the hand will be a push for both wagers. As for the poker hand, again this would be a push as all the players and the dealer would have the same hand.

However, a free-card option could be introduced. This would allow the players and the dealer with an opportunity to improve their hand by drawing an ace. If any of the players do in fact draw an ace and the dealer fails to draw an ace, then that player would in effect beat the dealer in both the blackjack hand and poker hand. On the other hand, if the players fail to draw an Ace and the dealer does in fact draw an ace, then the dealer would win all wagers.

The free card option could also be offered when the three community cards total 27, 28 and 29. In such cases, depending on the total of the community cards, players and dealer would have more options to improve their hand without busting. For example:

The three community cards total 27 and contain the King and Queen of spades with the other card being the Seven of diamonds. In this case, players will be looking to improve both the blackjack hand and poker hand. For example, a player drawing an Ace, Two, Three, or a Four, would improve their total for blackjack. An Ace would also improve their poker hand by making a three-card straight.

If a player's free card is an Ace, Two, Three, or Four of spades, then the player not only improves their blackjack total, but also their poker hand by making a flush, in this case with three cards.

An additional payout could be granted for three community cards that are both blackjack and also a straight and/or royal flush: Queen, King, Ace.

A further option is to grant an additional payout if two of the cards in the player's hand are any face card and the third card is an ace, as shown in FIG. 8, with an extra payout of, for example, 2-1 or 1.5-1.

If the three community cards contain two cards of a value of Ten (any ten and any picture card), with an ace, this is deemed to be a special situation and all players would win. The payout of this could vary from 1-1 on each wager to 2-1, 3-1 or even greater on each wager.

This version allows the card games to be played in a variety of ways.

Option one is the simple version and would require no strategy by the player.

EXAMPLE

Each player places equal wagers on both the blackjack and poker hands. The dealer would then deal three community cards. In any instance when the three community cards do not have a combined value of twenty-one (two cards having a value of ten and an ace); the players will be dealt further free cards to improve their hand.

Example Hand

Community cards are King of spades, Queen of spades, and Seven of diamonds. Each player therefore has a total of 27 for the blackjack hand and King-Queen-seven for the poker hand.

The dealer will therefore deal one or more free cards to each player in turn. In the above example, the number of free cards a player receives will be determined when a player busts (reaching a points total of 32 or more), or when a player reaches the best possible blackjack points total of 31.

Example Hand

First player is dealt a Two of spades. This improves both the blackjack hand (now a total of 29) and the poker hand (now a flush with three cards). However, since the player has not reached the best possible blackjack point total (31), the player will receive further cards. In this case, the player is now dealt the Ace of spades and has again improved both hands. The blackjack hand now totals 30 points and the poker hand now stands at a royal flush (in this case the poker hand is made using three cards from all the cards available).

However, since Player A's blackjack points only total 30, the player is dealt another card. If the player gets dealt another Ace, then he has reached the maximum points total for blackjack. If the card is higher than an Ace, then the player has bust (32 or over). In this example, the player is actually dealt a Three and has bust. The Three is therefore discarded and the player has to settle for a points total of 30.

The next player, Player B, gets a first free card, which is the Four of diamonds. This improves his blackjack points total to 31. Although this does not improve the player's poker hand, the player will not receive any further cards.

The next player, Player C, is now dealt a free card. In this case, the player's card is a Five of spades. Since this card now means that the player has in fact bust, the player will not receive any further free cards. The Five of spades is now discarded and the player's hand will remain at 27 for blackjack and a King-Queen-Seven high for the poker hand.

It is now the dealer's turn. If the dealer also busts, then the players who have improved either the blackjack or poker hands will be paid 1-1. The dealer will push with any player that has failed to improve either hand.

In the above example; the first two players have improved on their blackjack hand and therefore win 1-1. The first player also improved the poker hand and again will be paid at 1-1. The second player also will be paid 1-1 on the blackjack hand. However, the poker hand is the same as the dealer and is a push.

A further option is to introduce full strategy by not allowing any free cards. In this case, when a player busts, the wager is lost. As for the poker wager, there is the option to also declare the poker hand a loser when the player busts, or to keep the poker hand active. If still active, then the player would push on the poker hand if the dealer also bust.

A limited strategy is also viable by only offering a free card when the player or dealer's point value is at a certain value. For example; players may be dealt a free card on 22, 23, 24, 25, or 26, or any one or more of these. For example: Players receive a free card only when their blackjack point's score is at 24, 25, or 26.

In order to create a house edge and using the above example, the dealer could be allowed a free card on 24, 25, 26 and 27. In examples where the blackjack total is 41, the dealer could be allowed a free card on 34, 35, 36, and 37.

Another feature could be introduced whereas the players win their blackjack hand when the three community cards score a total of 30 points made up from three picture cards and/or three Tens.

A further optional wager could be offered whereas players are offered varying odds on the point's value of the three community cards. For example, for 10 points or less, the odds would be 5-1. Points totaling between 10 and 15 would pay 3-1. Points between 15 and 20 would pay 2-1. Points for 25 to 29 would pay 5-1. Points for thirty would pay 5-1 etc. These "Points Score" and odds are just an example—the final odds and which points value will be used, would be dependent on the final math.

Version Five

In this version, there is no competing dealer and only one player. Gameplay can be as in any of the above versions, except that the single player's hands are not competing against those of a dealer or other players. Instead a player's winnings or payouts are based on a predetermined pay table. The pay table sets out specified payouts for each type of hand a player may be dealt.

Simplified Version

A simplified version of the rules would therefore be as follows:

Players must place a wager on both blackjack and poker

The dealer deals three community cards from which the players and the dealer will use as part of the blackjack hand and poker hand If the three community cards total 30, or one point below the set numerical limit, then all players win the blackjack wager and tie the poker hand.

If the three community cards total 31, or the set numerical limit, then this would be classed as special situation in which all players would win. The odds for this would vary from 1-1 to 3-1 or greater.

If the three community cards total between 27 and 29, the player and the dealer would receive one free card in order to improve both hands. If the free card takes the points total over 31, then that card is discarded and player's hands will be formed from the three community cards. This also applies to the dealer.

If the three community cards total 25 or 26, the players and the dealer will receive a further free to improve their hand. If the total exceeds 31, then that card would be discarded and the hands would stand as is.

At any time when the player's blackjack hand stands at 22, 23, and 24, then the player may draw further cards. These will not be free cards and player will bust if going over 31.

Depending on the final math, when the player or dealer busts, then the three community cards will be used to form their poker hand.

Version Six

This version is also a split game but split into three pots, with a third going to the best 3-card poker hand, and a third each to the best blackjack points total to 21 and 31. It may also be possible for the split to be 40, 30, 30, with 40% going to the best poker hand, 30% to the best blackjack points total to 21, and 30% to the best blackjack points total to 31.

Rules

Players are dealt two cards face down (as in Texas Holdem), followed by a round of betting. This will be followed by a community board of three cards, but one card at a time and a round of betting between each card.

Stud Version

In this version, there is no flop as players receive individual cards.

Therefore, players are dealt two cards faced down, with a round of betting. Players still in the hand will each receive three more cards, face up, with a round of betting between each card.

With players having five cards, there are two options in how winning hands are determined. In both versions, players must use three cards to create either the best poker or blackjack hand. One option is to use the same three cards to represent all three possible hands. The other option is to allow players to use any combination of three cards for the poker hand and the blackjack hands.

Felt Version

In the main version, players are dealt five cards before determining the best three cards. In this version, players will be dealt two cards each with an option to double down on both wagers on any hand not containing an Ace.

Another feature that can be added is to offer a bonus payout if the player sticks on three cards (declines further cards). This would happen rarely but is very much viable and changes the dynamics of the game.

In all other cases, a player will be dealt five cards in which the same three cards will determine the poker hand and the blackjack score.

Cash Game and Tournament Structure

Played like holdem with blinds. Split game with 50% going to best blackjack hand and 50% going to best 3 card poker hand.

Each player receives two face-up cards and a round of betting takes place.

Each player then receives a third face up card and a second round of betting takes place, the first player to act being the player with the poker high hand.

Each player then receives a fourth face up card and a third round of betting takes place, the first player to act being the player with the poker high hand.

Each player then receives a fifth face up card and a fourth round of betting takes place, the first player to act being the player with the poker high hand.

Players must chose their hand prior to any hand being showed in a showdown. For example, a player's hand maybe Ac, 2c, 3c, Jh, Kd. In this case, a player may choose A, 2, 3 for a straight flush and score of 16 for blackjack or J-K-A for a score of 21 for Blackjack and Ace high for poker. In effect, a player cannot combine three-card hands—they must discard two cards before showdown.

One possible variation is to play with by allowing players to use all five cards and combine three-card hands to use three cards for one hand and three for another.

Version Seven

In this version of the card game, a player is dealt five cards and elects to discard two cards, leaving the player with three cards. The player then draws cards continuously until the point value of the cards in the player's hand reaches 31 (or another predetermined point value). The player then bets against the dealer to see who can reach a point value of 31, or who has the value closest to 31.

The player also makes a poker hand using his three most appropriate cards, for example, three hearts to make a flush. In this version of the game, the player makes two bets against the dealer: one for the player's poker hand and one for the player's blackjack hand.

Variations to this version include initially dealing three cards to a player. In this version, there is no need to discard two cards, and the player keeps the three cards initially dealt to the player. The player then continuously draws cards until the point value of the cards in the player's hand reaches 31 (or another predetermined point value). The player uses the cards to make both a blackjack hand and a poker hand using the three best cards.

Version Eight

In this version of the card game, the game may combine two or more versions of the card game described herein. For example, a player may be playing for a blackjack hand of 21 points and the rules of the game may allow the player to elect to play to 31 points, or, in some examples, even higher point values such as 41, 51, 61, or higher. The player may elect to raise the point level for a number of reasons. For example, a player may elect to raise the point value if they bust (go over 21 points). As another example, a player may elect to raise the point value if they are approaching 21 points but believe they are more likely to reach a higher set point value than they are to reach 21 points. A player may be required to, or have the option to, place a higher bet or buy back in to the game if they elect to raise the point value to 31.

The various embodiments described above are provided by way of illustration only and should not be construed to limit the claims attached hereto. Those skilled in the art will readily recognize various modifications and changes that may be made without following the example embodiments and applications illustrated and described herein and without departing from the true spirit and scope of the following claims.

What is claimed is:

1. A method of operating a gaming machine for playing a playing card wagering game comprising:

providing a gaming machine;

providing a non-transitory computer readable medium encoded with instructions and executed by a processor to perform the steps of:

causing at least one processor to execute a plurality of instructions stored in at least one memory device to operate with at least one input device to receive a first wager and a second wager, the wagers being of equal value, from a player for a play of a game;

after receiving the wagers, causing the at least one processor to execute the plurality of instructions stored in the at least one memory device to determine a plurality of playing cards for an initial player hand and an initial dealer hand for said play of the game from a virtual deck of playing cards;

causing the at least one processor to execute the plurality of instructions stored in the at least one memory device to operate with at least one display device to display the plurality of cards of the initial player hand and the initial dealer hand face up;

causing the at least one processor to execute the plurality of instructions stored in the at least one memory device to operate with the at least one input device to receive an optional request from the player for at least one player draw card from the virtual deck of playing cards;

causing the at least one processor to execute the plurality of instructions stored in the at least one memory device to operate with the at least one display device to display the at least one player draw card face-up into the initial player hand from the virtual deck of playing cards;

causing the at least one processor to execute the plurality of instructions stored in the at least one memory device to operate with the at least one display device to display at least one dealer draw card face-up in the initial dealer hand from the virtual deck of playing cards;

causing the at least one processor to execute the plurality of instructions stored in the at least one memory device to determine whether the initial player's hand and the at least one player draw card hand beats the initial dealer's hand and the at least one dealer draw card according to both a highest poker hand and also according to a 31 point blackjack hand;

causing the at least one processor to execute the plurality of instructions stored in the at least one memory device to determine any awards to be provided to the player based on the comparison to the dealer hand and according to a pay table; and causing the at least one processor to execute the plurality of instructions stored in the at least one memory device to cause any determined awards to be provided to the player.

2. The method of claim 1, wherein the blackjack hand is played according to a point total greater than 31 points.

3. The method of claim 1, wherein a different player acts as dealer each hand.

4. The method of claim 1, wherein a player receives an additional payout if the player's first three cards consist of two face cards and an Ace.

5. A method of operating a gaming system, said method comprising:

causing at least one processor to execute a plurality of instructions stored in at least one memory device to operate with at least one input device to receive a first wager and a second wager, the wagers being of equal value, from a player for a play of a game;

after receiving the wagers, causing the at least one processor to execute the plurality of instructions stored in the at least one memory device to determine five playing cards for an initial player hand and five cards for an initial dealer hand for a player for said play of the game from a virtual deck of play cards;

causing the at least one processor to execute the plurality of instructions stored in the at least one memory device to operate with at least one display device to display the five playing cards of the initial player hand face up and to display the five playing cards of the initial dealer hand face down;

causing the at least one processor to execute the plurality of instructions stored in the at least one memory device to operate with the at least one input device to receive two discarded cards from the player, such that the player maintains three cards in the player's hand;

causing the at least one processor to execute the plurality of instructions stored in the at least one memory device to discard two cards from the dealer's hand, such that the dealer maintains three cards face down in the dealer's hand;

causing the at least one processor to execute the plurality of instructions stored in the at least one memory device to operate with the at least one display device to display the face down cards from the dealer's hand face up;

causing the at least one processor to execute the plurality of instructions stored in the at least one memory device to determine whether the player's hand beats the dealer's hand according to a highest poker hand;

causing the at least one processor to execute the plurality of instructions stored in the at least one memory device to determine whether the player's hand beats the dealer's hand according to a 21-point blackjack hand, causing the at least one processor to execute the plurality of instructions stored in the at least one memory device to determine any awards to be provided to the player based on the comparison to the dealer hand and according to a pay table; and causing the at least one processor to execute the plurality of instructions stored in the at least one memory device to cause any determined awards to be provided to the player.

6. The method of claim 5, wherein the player's hand does not beat the dealer's hand when the sum of the points value of the player's three cards is greater than 21.

7. The method of claim 6, the method further comprising causing the at least one processor to execute the plurality of instructions stored in the at least one memory device to operate with the at least one input device to receive an additional wager from the player.

8. The method of claim 6, the method further comprising causing the at least one processor to execute the plurality of instructions stored in the at least one memory device to operate with the at least one input device to receive an additional wager in order to buy a chance to compare the player's cards with the dealer's cards according to a 31-point blackjack hand.

9. The method of claim 5, wherein a different player acts as the dealer each hand.

10. The method of claim 5, the method further comprising causing the at least one processor to execute the plurality of instructions stored in the at least one memory device to operate with the at least one input device to accept the player's decision to compare the player's cards with the dealer's cards according to a 31-point blackjack hand, wherein the player is deemed to have lost if a sum of the points value of the player's three cards is greater than 31.

11. The method of claim 10, the method further comprising causing the at least one processor to execute the plurality of instructions stored in the at least one memory device to operate with the at least one input device to receive an additional wager in order to raise the points value of a winning blackjack hand from 21 to 31.

12. The method of claim 5, the method comprising causing the at least one processor to execute the plurality of instructions stored in the at least one memory device to determine three playing cards for an initial player hand and three cards for an initial dealer hand, and wherein no cards are discarded.

13. The method of claim 1, wherein the player's hand does not beat the dealer's hand if a sum of the points value of the player's cards is greater than 31.

14. The method of claim 13, the method further comprising causing the at least one processor to execute the plurality of instructions stored in the at least one memory device to operate with the at least one input device to receive an additional wager from the player.

15. The method of claim 1, the method causing the at least one processor to execute the plurality of instructions stored in the at least one memory device to determine three playing cards for an initial player hand and three cards for an initial dealer hand, and wherein no cards are discarded.

* * * * *

UNITED STATES PATENT AND TRADEMARK OFFICE

CERTIFICATE OF CORRECTION

PATENT NO. : 8,905,404 B2
APPLICATION NO. : 13/747289
DATED : December 9, 2014
INVENTOR(S) : Peter Costa It is certified that error appears in the above-identified patent and that said Letters Patent is hereby corrected as shown below:

In the specification:

Column 3, line 46 should read as follows:
--If a player's score is over 21...--

Column 3, line 54 should read as follows:
--...few starting hands deemed to be...--

Column 4, line 9 should read as follows:
--...powerful hand for heads up or...--

Column 4, line 64 should read as follows:
--...multi-way action in a majority of...--

Column 6, line 31 should read as follows:
--...some embodiments, players may...--

Column 6, line 51 should read as follows:
--...possible in all versions of the card...--

Column 7, line 38 should read as follows:
--...located remotely from computing...--

Column 8, line 33 should read as follows:
--...may be used in the network 304...--

Column 8, line 62 should read as follows:
--...dealt to the each player is dealt...--

Signed and Sealed this
Nineteenth Day of January, 2016

Michelle K. Lee
*Director of the United States Patent and Trademark Office*

In the specification:

Column 9, lines 1-2 should read as follows:
--...dealt to the each player are visual...--

Column 9, line 4 should read as follows:
--...dealing to the each player and the...--

Column 9, line 17 should read as follows:
--...if the player's cards beat the dealer's...--

Column 9, lines 21-22 should read as follows:
--...processor (302A) and a memory (302B), and...--

Column 9, line 24 should read as follows:
--...which, when executed by the respective...--

Column 10, line 13 should read as follows:
--...brought into the format for the purpose...--

Column 10, line 30 should read as follows:
--...all versions of the card games...--

Column 10, line 54 should read as follows:
--...one card face down and then another...--

Column 11, line 32 should read as follows:
--...the same time making the best...--

Column 11, lines 34-35 should read as follows:
--In another option, if the player goes over 31, the player's poker wager hand is allowed to still be active.--

Column 12, lines 44-45 should read as follows:
--...free card on 27 and drew the Five of...--

Column 12, line 55 should read as follows:
--...ace, as shown in FIG. 2, with an...--

Column 13, line 13 should read as follows:
--...would provide the players and the...--

Column 13, line 37 should read as follows:
--...both blackjack and a straight and/or...--

In the specification:

Column 13, line 41 should read as follows:
--...ace, as shown in FIG. 2, with an...--

Column 14, line 4 should read as follows:
--...total of 32 or more) or when a player...--

Column 15, line 21 should read as follows:
--...on both a blackjack and a poker hand.--

Column 15, line 24 should read as follows:
--...and poker hand.--

Column 16, line 43 should read as follows:
--Players must choose their hand...--

Column 16, line 44 should read as follows:
--...a player's hand may be...--

Column 16, line 50 should read as follows:
--...variation is to play by allowing...--